Feb. 9, 1932.  C. H. WHITE  1,844,533
HARROW
Filed March 17, 1930  2 Sheets-Sheet 1
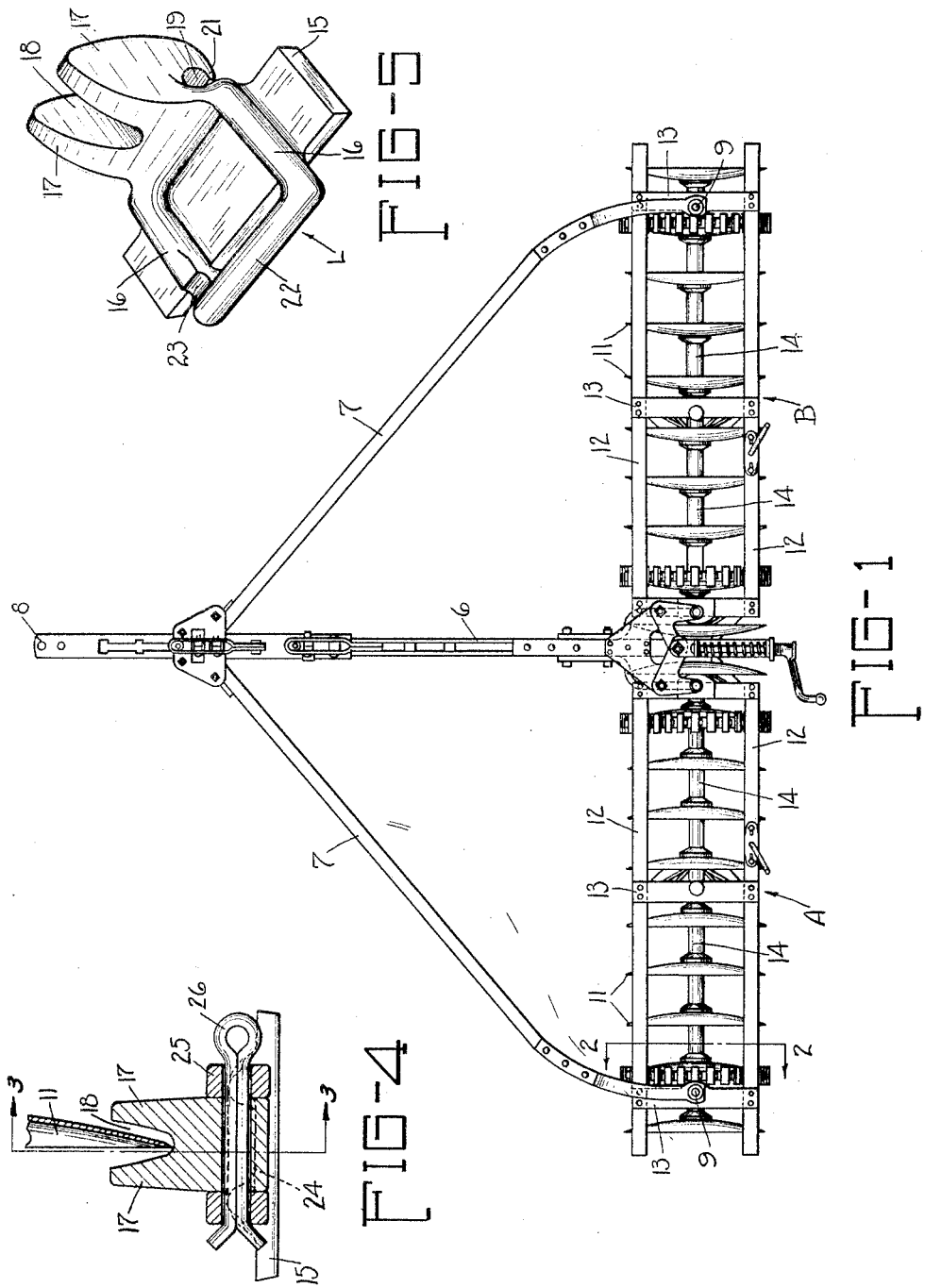
INVENTOR
Charles H. White
BY Brown, Jackson, Boettcher & Dienner
ATTORNEYS
WITNESS
Walter Ackerman

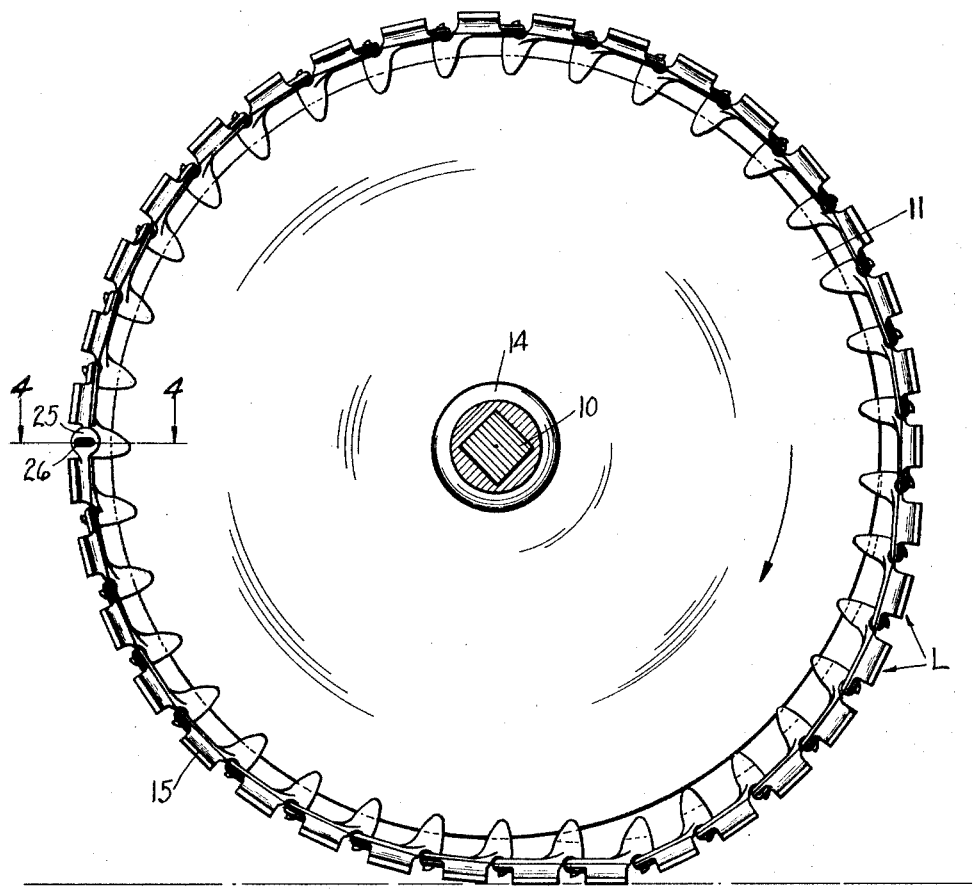
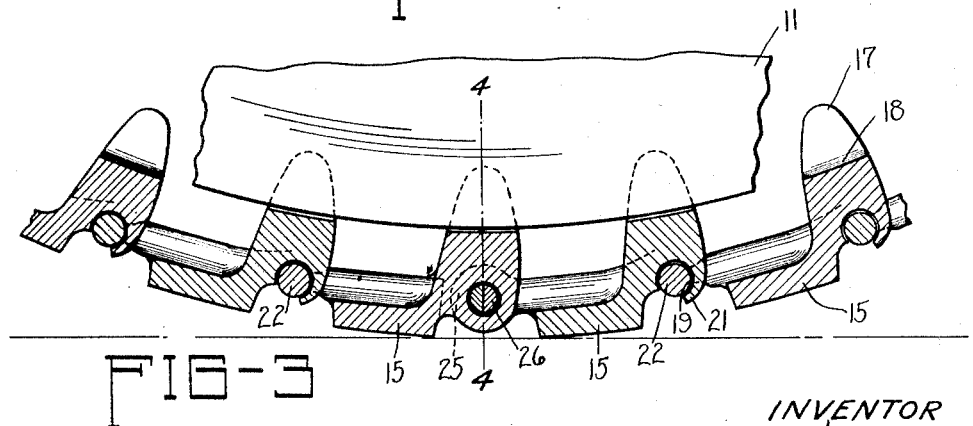

Patented Feb. 9, 1932

1,844,533

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

HARROW

Application filed March 17, 1930. Serial No. 436,341.

This invention relates to harrows and has to do more particularly with disc harrows and the provision of means for protecting the cutting edges of the discs when the harrow is being transported from place to place. When the farmer transports a harrow from one field to another, ordinarily he merely straightens the gangs and allows the harrow to roll along on its discs. However where it is necessary to transport the machine over hard roads the discs may be injured if they are allowed to bear directly on the road surface, and furthermore, in some states the transportation of harrows in this manner on hard roads is forbidden by law, owing to the damage that the cutting edges of the discs are liable to inflict on the road surface.

With the above in view, my invention has for its principal object the provision of means, in the form of what may be termed transport chains, which are adapted to be connected to certain discs of each gang of the harrow so as to elevate all the discs of the gang from the ground when it is desired to transport the harrow, and thereby prevent the cutting edges of the discs from coming in contact with the ground surface or with the surface of a road, in this manner preventing damage to the cutting edges of the discs and also to the road surface.

Another object of my invention is the provision of such means which may be quickly and easily attached to and detached from the discs of the harrow.

A further object of the invention is the provision of this means which is of such form and material that the disc to which it is attached will not be worn or damaged in the rolling of said disc in transport.

A still further object of the invention is to provide such means that may be easily and quickly adapted for use with any size of disc and which may be easily and quickly adjusted to accommodate for wear of the disc occurring after long continued use thereof.

I accomplish my several objects as pointed out hereinafter in connection with the accompanying drawings, in which:

Figure 1 is a plan view of a portion of a harrow equipped with my improved means for preventing contact of the discs with the ground, the outer ends of the main gangs being omitted;

Figure 2 is an enlarged sectional view taken on the plane of the line 2—2 of Figure 1 and illustrating one of my transport chains in operative position on one of the discs;

Figure 3 is an enlarged sectional view taken on the plane of the line 3—3 of Figure 4;

Figure 4 is an enlarged sectional view taken approximately on the plane of the line 4—4 of Figure 2 or of Figure 3, and illustrating the means for connecting the two ends of the chain together in position on a disc; and Figure 5 is a perspective view on an enlarged scale of one of the links of the series that go to make up the chain.

While I have illustrated my improvements as applied to a disc harrow of the type shown and described in my pending application, Serial No. 312,325, filed October 13, 1928, it is to be understood that my invention may be applied to any other type of implement to which it is adapted, where it is desirable to prevent damage to the cutting edges of the discs or to road surfaces when the implement is transported. The harrow as a whole has nothing to do with my present invention, and, therefore, it will be but briefly described herein.

The main elements of this type of harrow comprise the two gangs A and B, which are disposed substantially abreast of each other in oppositely extending relation, but it will be evident that the present transport chains are also applicable to tandem harrows, etc. In this illustrative form the rear end of a central draft member 6 has pivotal connection with the inner ends of both gangs, and the front end of said draft member is adapted to have draft connection with a tractor or other drawing means at the hitch point indicated at 8. Two laterally divergent draft bars 7 are pivotally connected at their rear ends with the outer portions of the two gangs at 9, and have pivotal connection at their front ends with the central draft member 6 in the manner described in my said pending application above referred to.

The two gangs are duplicates, with the exception that the discs 11 thereof face in opposite directions. Each comprises a frame built up of two parallel angle bars 12 which are cross-connected at spaced points by transverse frame bars 13. The mounting of the shaft 10 which extends longitudinally of the gang and carries the discs 11 with the latter held in spaced relation by the sleeves 14, is fully illustrated and described in the above-mentioned application, and as it has nothing to do with the present invention it is not necessary to refer to it herein.

Coming now to the improvements which form the subject-matter of my present application, the transport chain is preferably of the lock-link or Ewart type, but it should be understood, of course, that any other type of chain may be used without departing from the spirit of my invention. As shown, said chain comprises a series of links L, the configuration of which is best shown in Figure 5. Each link is provided on one face portion thereof, which I shall term the outer face, with an extended flat bar portion 15 cast integral therewith, the ends of the bar portion extending out beyond the side members 16 of the link. Extending inwardly from the link, at the rear portion thereof as seen in Figure 5, are two projections or prong portions 17 which at their bases are formed integral with each other and with the link, and these projections 17 diverge toward their outer ends so as to form a V-shaped groove 18 between them for accommodating the edge of the disc, as shown in Figure 4.

The outside lower portion of the rear end of the link that forms the projections 17 is provided with a recess 19, which includes a hook member 21 formed integral with and extending transversely across the base portion of said projections. This recess is adapted to receive the front member 22 of the next adjacent link of the chain, as shown in Figure 3. As shown in Figure 5, one side member 16 of the link L is provided with a transversely extending groove 23 therein adjacent to the front or loop-like end member 22 so that by folding two adjacent links to a certain position relative to each other the links may be connected together or taken apart, this groove permitting removal of the hook member 21 of one link by sliding it transversely of the member 22 of the other link when in such folded position, as is well understood by those familiar with this type of chain link.

As shown in Figures 3 and 4, the two end links of each chain are constructed somewhat differently from the other links. The link at one end of the chain is not provided at its rear end portion with the open bottom recess 19 and hook member 21, but is made solid and has a hole 24 formed therethrough from one side to the other, while the link at the opposite end of the chain to which this first mentioned link is adapted to be connected is not provided with the front transversely extending member 22, but in lieu thereof the side members 16 are provided at their forward ends with eye members 25. These eye members 25 are adapted to interlock with or span the rear portion of the first mentioned link so that the holes in the eye portions aline with the hole 24 in the other link, and the two links are secured together by a cotter pin 26 which is passed through the holes in said eyes and through the hole 24, as shown in Figure 4.

By reason of the transport device being in the form of a chain, by the removal or addition of one or more links any size of disc may be accommodated, and the chain may be shortened very readily and easily to accommodate for wear of the disc.

The metal of which the chain links are formed is somewhat softer than the metal of the discs, so that if any wear should occur it will be on the links rather than on the cutting edge of the disc.

When it is desired to place the transport chains on several of the discs of each gang of the harrow, the operator first straightens the gangs; then a transport chain is laid out flat on the ground in front of each disc chosen to carry it. Then the harrow is pulled on to the chains and the chains are wrapped around the discs, the two end links of each chain being fastened together by means of the cotter pin as above described. It should be noted in this connection that the outer ends of the projections or prong portions 17 of each link are spaced rather widely apart, so that even though the chain, preparatory to placing it on a disc, is laid down in front of the disc in a crooked line, the disc as it is run on to the chain will force the chain in alinement therewith. This wide spacing between the ends of the prong portions 17 also prevents the chain from coming off of a disc although the chain is very loose even to the extent that it could have a link removed therefrom so as to provide a better fit on the disc.

As will be readily appreciated, the discs to which the transport chains are applied will act as wheels, raising the gangs a short distance above the surface of the roadway, and as the outer side of the chain is provided with the wide flattened surfaces formed integral with each link there is no danger of the road being injured by the discs.

What I claim is:

1. The combination with a harrow comprising a frame and cutting discs carried by said frame, of means adapted to be connected with some of said discs for elevating all the discs of the harrow out of contact with the ground said means being provided with spaced tread surfaces extending laterally therefrom and completely around the peripheries of said discs.

2. The combination with a harrow comprising a frame and cutting discs carried by said frame, of means adapted to be connected with certain of said discs for elevating all the discs of the harrow out of contact with the ground, said means being in the form of a chain comprising a plurality of links which can be wrapped around the periphery of the disc, each of said links being provided with tread portions extending laterally beyond the side members thereof.

3. In a device of the class described, the combination with a harrow having discs, of a transport chain adapted to be mounted on certain of said discs for elevating all the discs of the harrow out of contact with the ground, said chain being provided with laterally extending tread portions.

4. A tread chain for disc harrows adapted to be mounted on a disc of the harrow to elevate the same from the ground, said chain comprising links relatively short having tread portions, elongated inwardly extending portions adapted to embrace the periphery of the discs; and interconnecting portions permitting links to be added to or removed from the chain by relative pivotal movement between the links, said elongated portions being adapted to retain the chain on the disc when its length is greater than the circumference of the disc by an amount equal to at least one link.

5. A transport chain for disc harrows adapted to be mounted on a disc of the harrow to elevate the same from the ground, said chain comprising rectangular shaped links provided with members projecting inwardly from one face portion thereof and adapted to embrace the peripheral edge portion of the disc.

6. A transport chain for disc harrows adapted to be mounted on a disc of the harrow to elevate the same from the ground, said chain comprising links provided with members projecting inwardly from one face thereof and adapted to embrace the peripheral portion of the disc, and tread portions on the opposite faces of said links for contacting with the ground surface, said tread portions extending laterally beyond the outer side portions of said links.

7. A transport chain for disc harrows adapted to be mounted on a disc of the harrow to elevate the same from the ground, said chain comprising links provided with members projecting inwardly from one face thereof and adapted to embrace the peripheral portion of the disc, and a tread portion extending across the opposite face of each of said links, said tread portion being formed integral with the side members and one end member of the link.

8. A transport chain for disc harrows adapted to be mounted on a disc of the harrow to elevate the same from the ground, said chain comprising links provided on one face with inwardly projecting diverging members adapted to embrace the peripheral portion of the disc, and a tread portion formed integral with the side members of each of said links on the outer faces thereof and extending outwardly beyond said side members.

9. A transport chain for disc harrows adapted to be mounted on a disc of the harrow to elevate the same from the ground, said chain comprising relatively short links each of which is provided on one face with inwardly projecting diverging members adapted to embrace the peripheral portion of the disc, the base portions of said projecting members being formed integral and provided with a hook member for connecting said link with the next adjacent link of the chain.

10. A transport chain for disc harrows adapted to be mounted on a disc of the harrow to elevate the same from the ground, said chain comprising a series of links, each of said links comprising a loop-like end member, a pair of diverging members projecting inwardly from the opposite end member and spaced inwardly from the side members of said link and adapted to embrace the peripheral portion of the disc and a hook member adapted to be connected with the loop-like end member of the next adjacent link, said loop-like end member being provided with a slot in one side thereof to permit the hook member of the next adjacent link to be connected with said end member.

11. As a new article of manufacture, a disc harrow tread chain link comprising a pair of inwardly diverging members formed integrally with one end member of said link and adapted to embrace the peripheral edge of a disc of a harrow, and a transversely extending tread portion formed integrally with said inwardly diverging members and with the side members of said link.

12. A tread chain for disc harrows adapted to be mounted on a disc of the harrow to elevate the same from the ground comprising a plurality of links each provided with integral members forming a substantially V-shaped recess adapted to receive the peripheral edge of the disc, and a tread portion extending transversely across and laterally beyond the sides of said link and formed integrally with said diverging members.

In witness whereof, I hereunto subscribe my name this 13th day of March, 1930.

CHARLES H. WHITE.

CERTIFICATE OF CORRECTION.

Patent No. 1,844,533. Granted February 9, 1932, to

CHARLES H. WHITE.

It is hereby certified that error appears in the printed specification of the above numbered patent requiring correction as follows: Page 3, line 37, claim 5, strike out the word "face"; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.